INVENTORS
ROBERT C. MINNICK
EDWIN S. LEE, III
BY Christie, Parker & Hale
ATTORNEYS Aug. 9, 1966 R. C. MINNICK ETAL 3,266,022

COMPUTER ADDRESSING SYSTEM

Filed Jan. 8, 1962

9 Sheets-Sheet 2

COMPUTER ADDRESSING SYSTEM

Filed Jan. 8, 1962

9 Sheets-Sheet 3

Aug. 9, 1966 R. C. MINNICK ETAL 3,266,022

COMPUTER ADDRESSING SYSTEM

Filed Jan. 8, 1962

9 Sheets-Sheet 4

INVENTORS.
ROBERT C. MINNICK
EDWIN S. LEE, III
BY
Christie, Parker & Hale
ATTORNEYS.

INVENTOR.
ROBERT C. MINNICK
EDWIN S. LEE, III
BY
Christie, Parker & Hale
ATTORNEYS.

COMPUTER ADDRESSING SYSTEM

Filed Jan. 8, 1962

INVENTORS.
ROBERT C. MINNICK
EDWIN S. LEE, III
BY
Christie, Parker & Hale
ATTORNEYS.

INVENTORS.
ROBERT C. MINNICK
EDWIN S. LEE, III
BY
Christie, Parker & Hale
ATTORNEYS.

United States Patent Office 3,266,022
Patented August 9, 1966

3,266,022
COMPUTER ADDRESSING SYSTEM

Robert C. Minnick, Menlo Park, and Edwin S. Lee III, Pasadena, Calif., assignors to Burroughs Corporation, Detroit, Mich., a corporation of Michigan Filed Jan. 8, 1962, Ser. No. 164,820
11 Claims. (Cl. 340—172.5)

This invention relates to digital computers and more particularly to an addressing system for a stored program computer system.

Generally, the memory unit in a digital computer is divided into sections. These sections include input, working, output and program sections. The program section is for storing orders, operand addresses and result addresses. The input section is reserved for new data coming into the computer. The working section is reserved for operands and for storage of result signals or data signals which have been processed. The output section is reserved for result signals being shifted out of the computer system. This requires that blocks of data signals stored in the memory unit be transferred around to the various locations in the memory in order to allow the computer to operate thereon. The timing and associated equipment for shifting signals around in memory is expensive and requires valuable computing time.

Another problem arises in digital computer systems where the new input signals are stored in certain memory locations and, subsequently, moved to other memory locations in order to optimize computer operation. In order to keep track of the location of the signals and determine their final storage location, arrangements have been devised whereby the signals are kept track of by a stored program. The stored program method of keeping track of signals in memory also uses valuable space in the memory and wastes valuable computing time.

In contrast, the present invention saves computing time and memory space by eliminating the necessity of transferring signals around in the memory of a computer system and by eliminating the necessity of a stored program and thus memory space to keep track of signals. This is accomplished by automatically translating the operand address signals, result address signals and the like to provide a correct memory address. This allows operands to remain in their original memory locations. Also, if signals have been moved, they may be addressed directly in their new memory location.

Briefly, a preferred embodiment of the invention in a computing system includes an encoder circuit and an addressable memory unit. The encoder circuit has addressable storage locations in which translated address signals are stored. The translated address signals are addresses of memory locations in memory where signals to be read out are stored.

A means for addressing and an instruction register is also provided. The means for addressing is connected for providing address signals both to the memory unit and the encoder circuit. The encoder circuit shifts out translated address signals from addressed storage locations. The shifted out translated address signals are stored in the means for storing address signals.

If the instruction signals stored in the instruction register specify that the address, stored in the means for storing, is to be translated the translated address signals are used to address the memory unit. If the instruction specifies that the address signals are not to be translated, the original instruction address signals stored in the means for storing are used to address the memory unit.

An arithmetic unit is provided for storing operand signals read out of the memory unit and for executing operations thereon as specified by each instruction.

A better understanding of the invention may be obtained with reference to the following detailed description of the figures of which:

Figure 1:
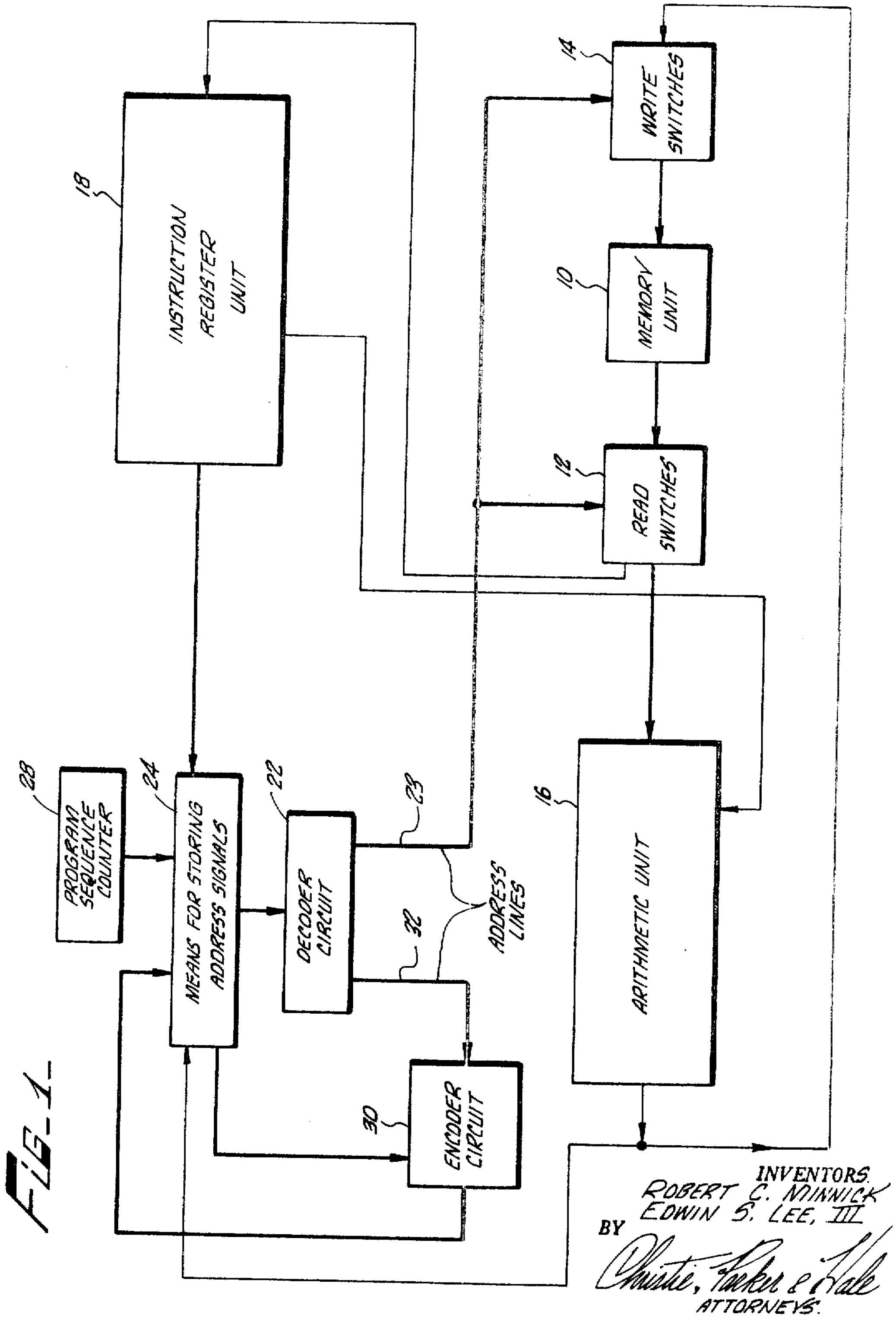
FIG. 1 is a general block diagram of a computer addressing system embodying the present invention.
Figure 2:
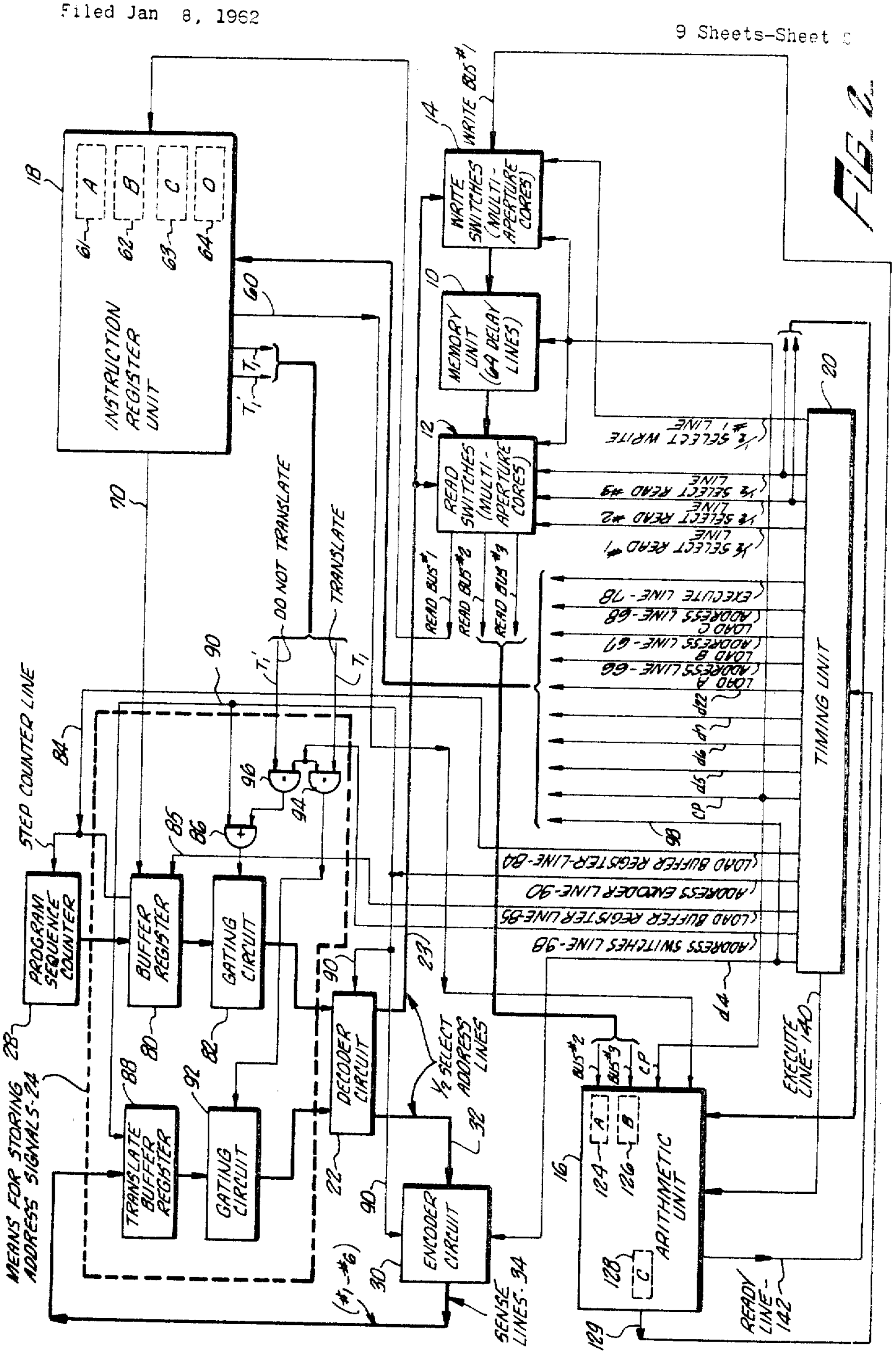
FIG. 2 is a block diagram, partly in schematic form, showing the details of the computer system of FIG. 1 for automatically translating address signals.
Figure 4A:
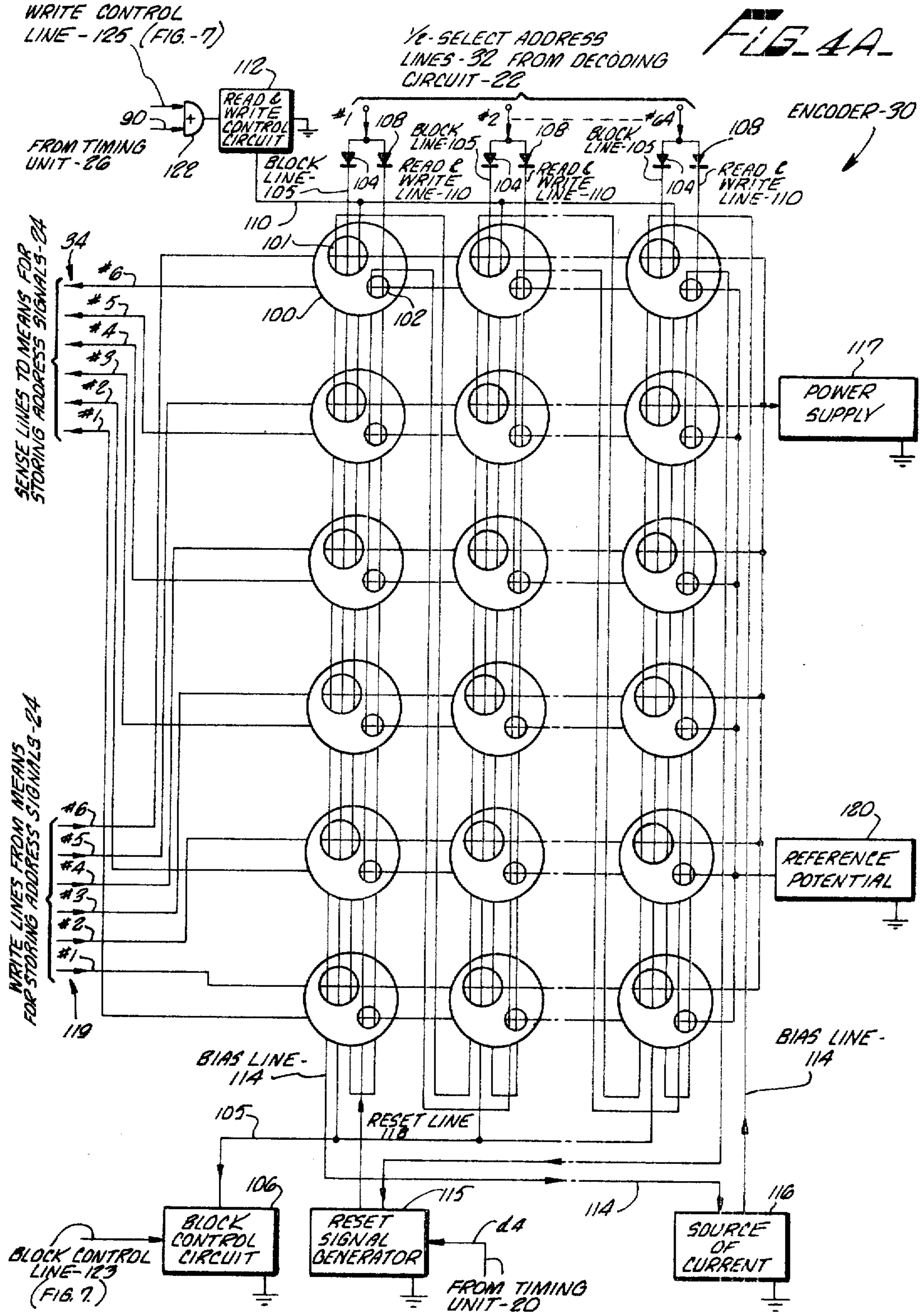
Figure 4B:
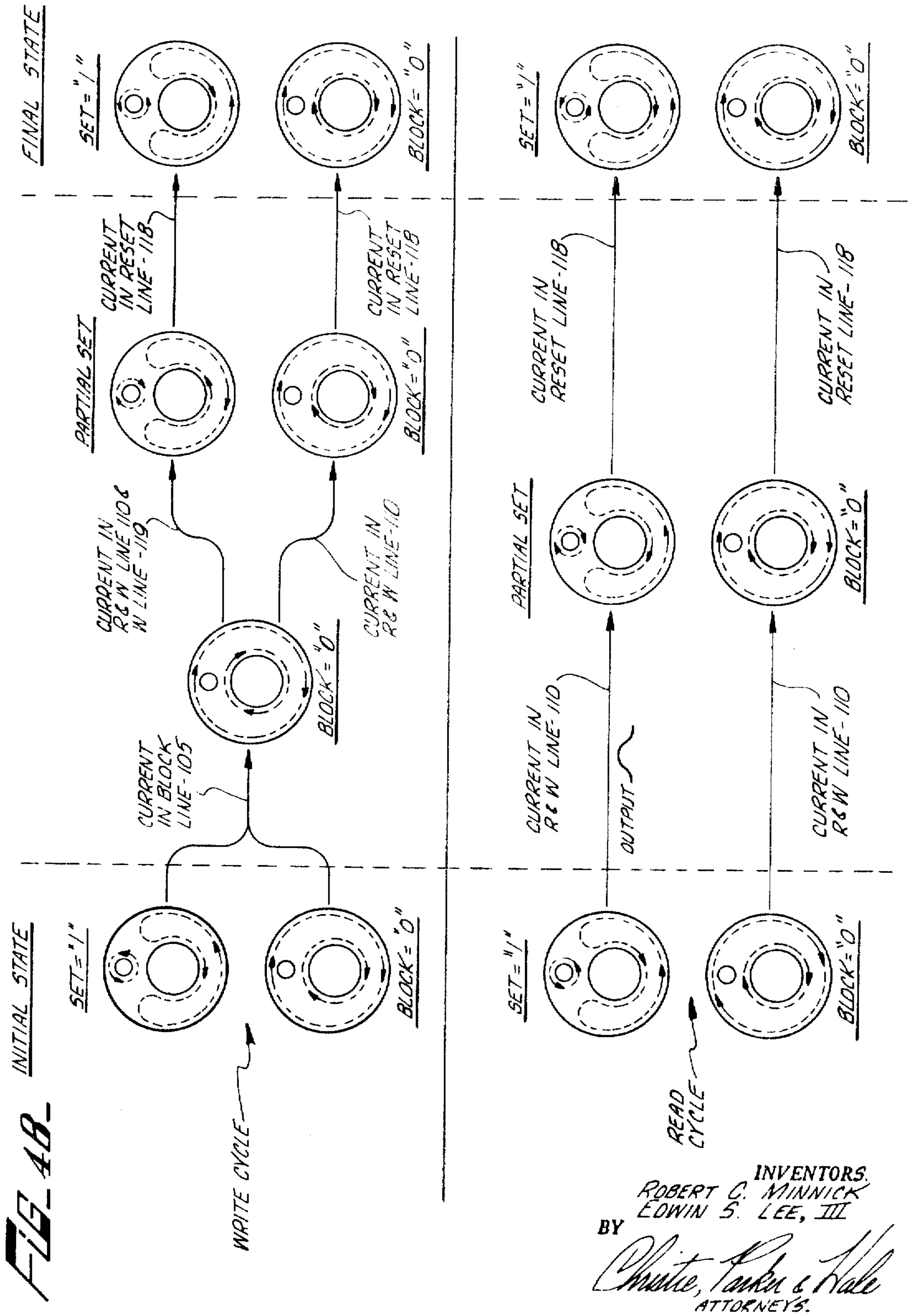
Figure 5:
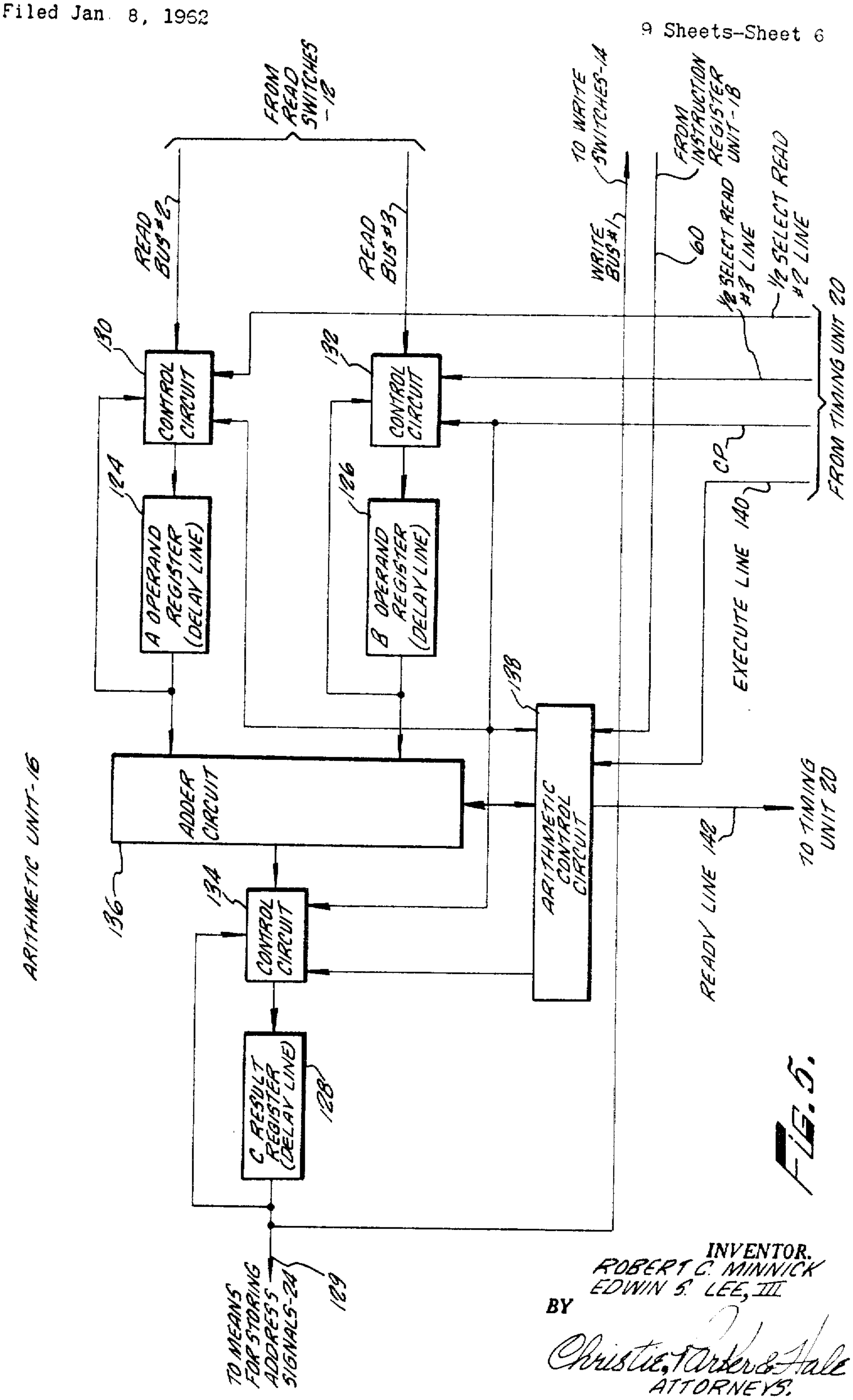
Figures 6A, 6B:
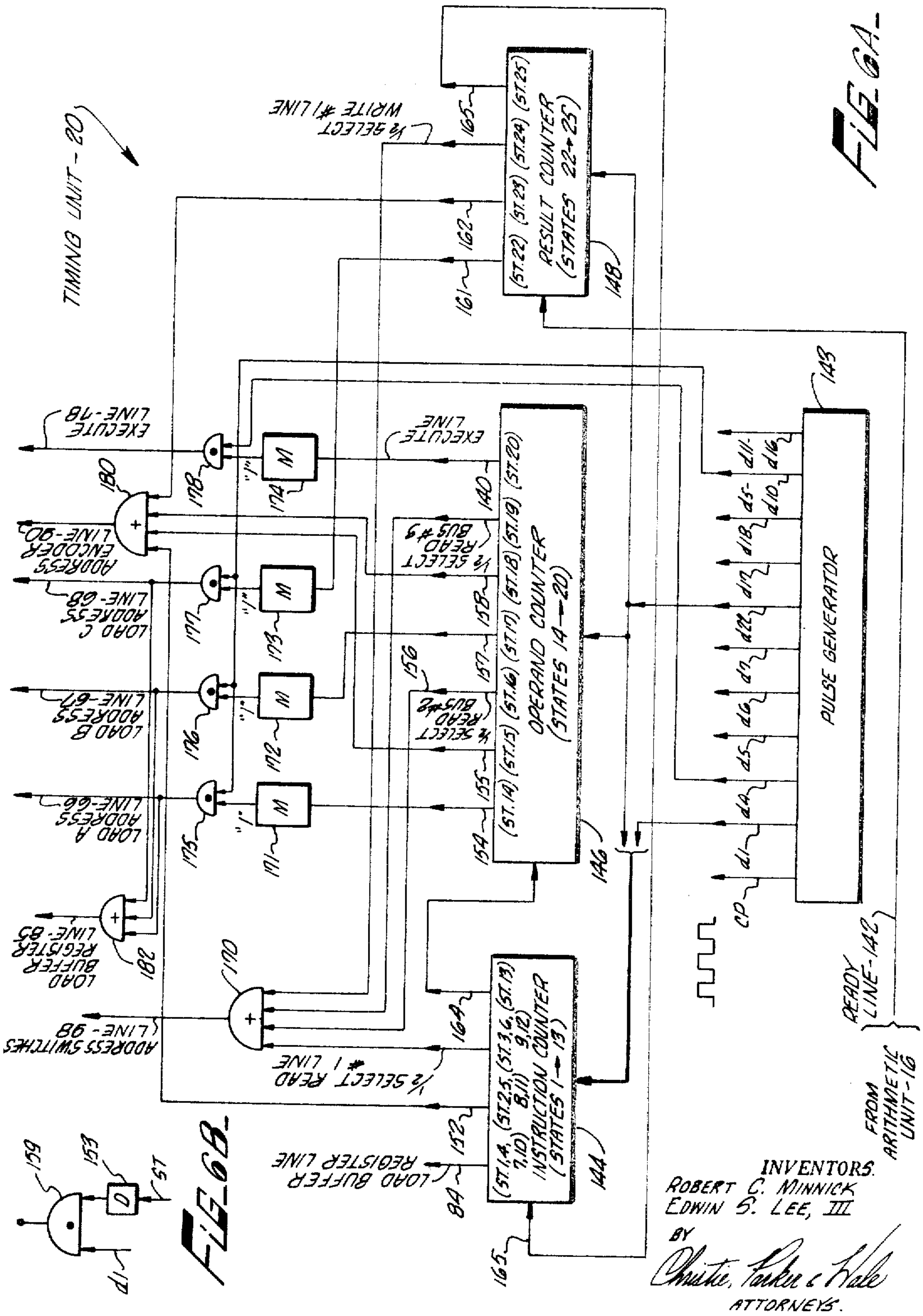
Figure 7:
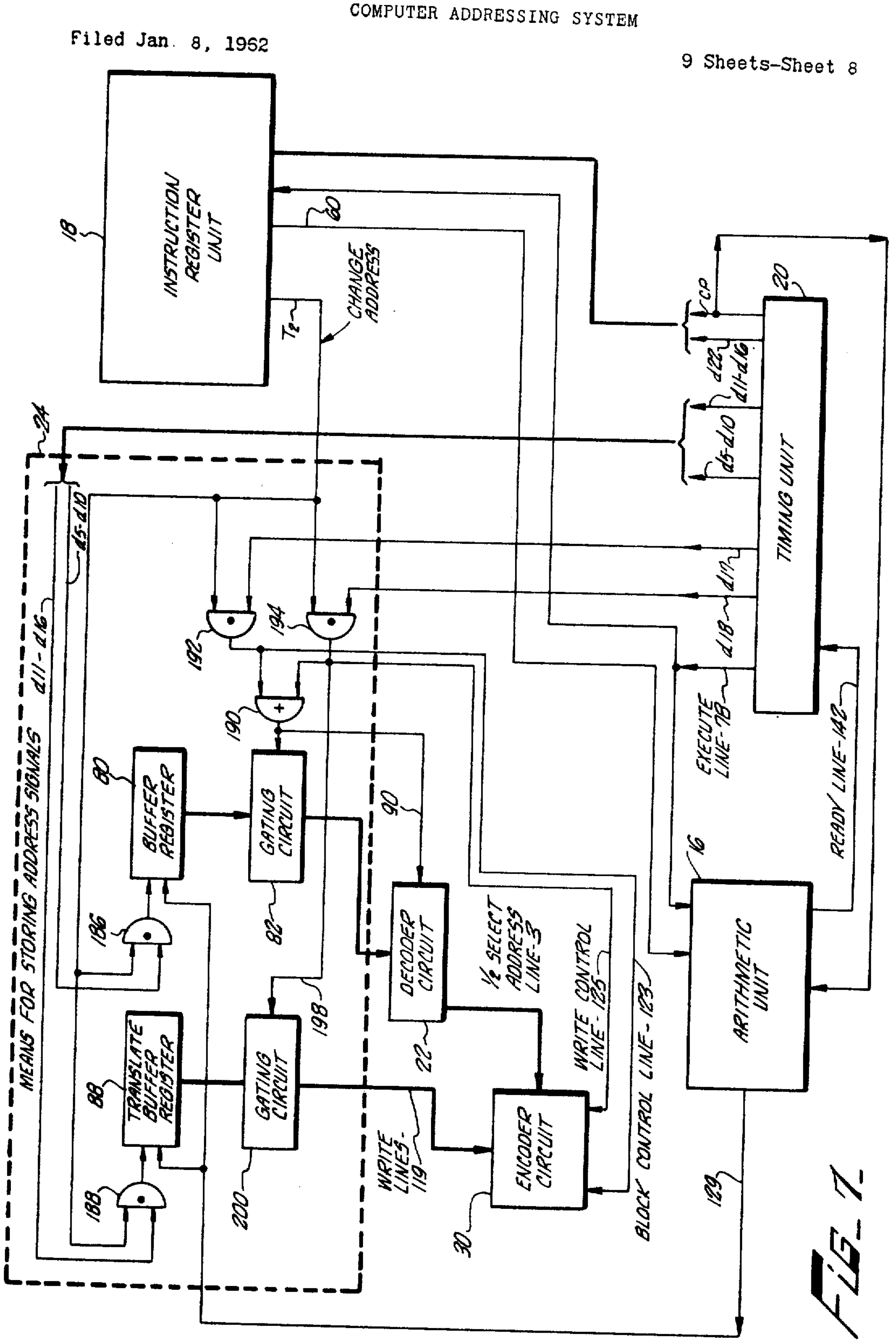
Figure 8:
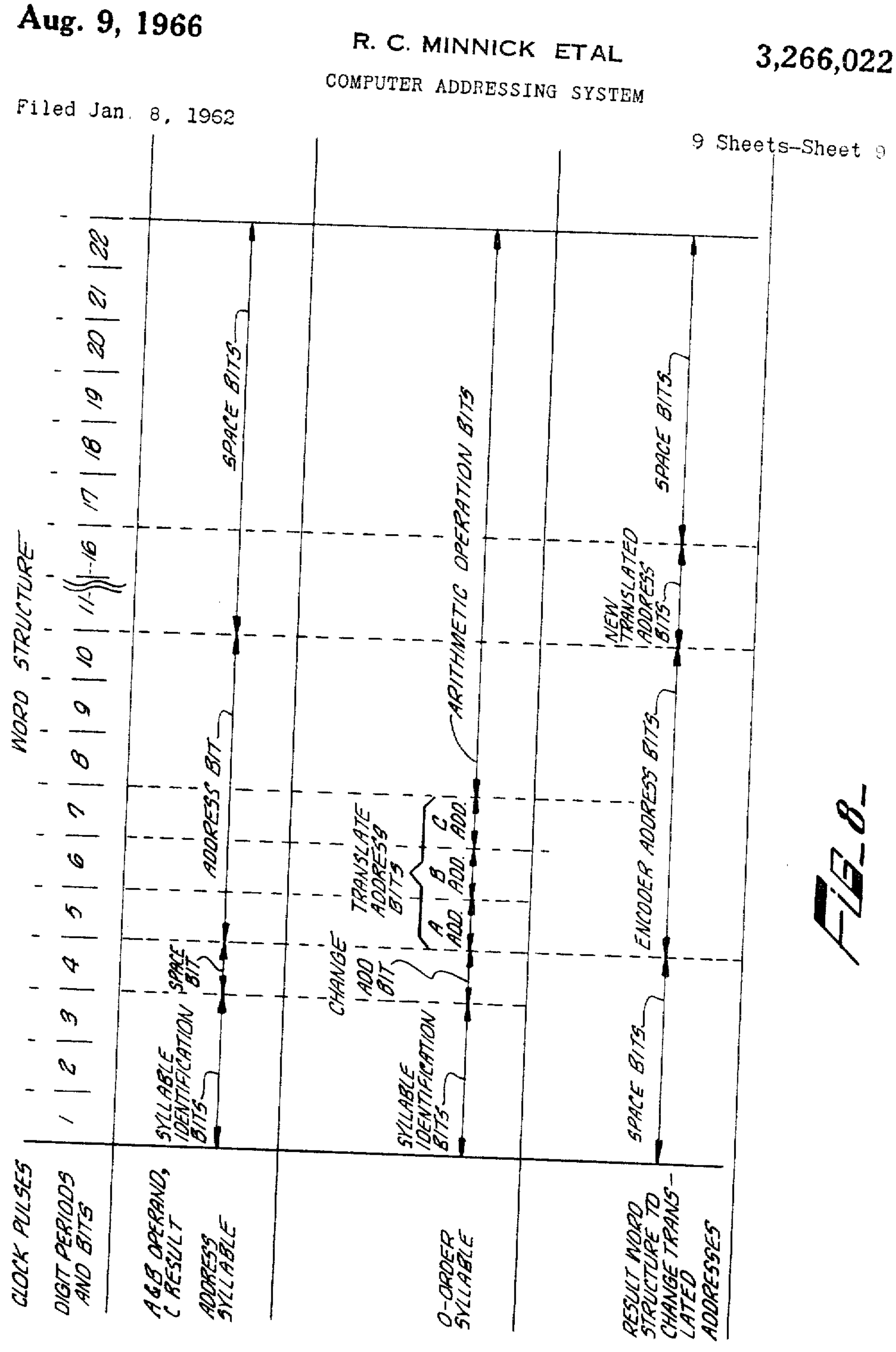

FIG. 4–A is a schematic diagram, partly in block diagram form, of a typical encoder circuit for use in the computer system of FIGS. 1, 2, and 7;

FIG. 4–B is a diagram illustrating the sequence of saturation states of the cores of FIG. 4–A during read and write cycles;

FIG. 5 is a block diagram of an arithmetic unit for the computer system of FIGS. 1, 2 and 7;

FIG. 6–A is a block diagram, partly in schematic diagram form, of a timing unit for the computer system of FIGS. 1, 2, and 7;

FIG. 6–B is a schematic diagram showing the output gating circuits of the counters of FIG. 6–A;

FIG. 7 is a block diagram, partly in schematic diagram form, showing the details of the computer system of FIG. 1 for changing the translated address signals in the encoder circuit; and FIG. 8 is a diagram showing the word structure used in the computer system of FIGS. 1, 2, and 7.

GENERAL DESCRIPTION

Refer now to FIG. 1 wherein a block diagram of a computing system is shown having a memory unit 10 and read and write switches 12 and 14 for reading and writing in the memory unit 10. Also included is an arithmetic unit and an instruction register 18 into which signals from the memory unit 10 are stored. A means for addressing including a decoding circuit 22 and a means for storing address signals 24 is also provided. A program sequence counter 28 and an encoder circuit 30 are also connected to the decoder circuit 22 and the means for storing address signals 24.

Briefly, the computer system of FIG. 1 operates to translate address signals as follows. The program sequence counter 28 is set into an initial state of operation corresponding to an initial address in the memory 10. The means for storing address signals 24 reads and stores instruction address signals developed at the output of the program sequence counter 28, and the program sequence counter 28 steps into its next state. The means for storing address signals 24 then applies the stored instruction address signals to the input circuit of the decoder circuit 22 and the decoder circuit 22 applies decoded address signals to the input circuit of the read and write switches 12 and 14. A connection is then established between the output circuit of the memory location specified by the instruction address signals and the input circuit of the instruction register unit 18. The addressed memory location contains one part of an instruction which is then shifted out to the instruction register unit 18 and stored there.

Refer now to FIG. 8. As indicated, the computer system has instructions which are divided into parts, including two operand addresses, a result address and an order, which specifies the operation to be performed by the computer system, hereinafter referred to as the A, B, C and O syllables, respectively. Each part of the instruction is stored in a separate memory location in the memory unit 10, therefore, requires a separate address signal to bring it out of the memory unit 10. Thus, one syllable was read out of memory 10 and the read switches 12 must be addressed three more times, in the same manner as described above, in order to read out the other three syllables of the complete instruction for storage in the instruction register unit 18.

After a full instruction has been stored in the instruction register 18, it shifts out the A-syllable for storage in the means for storing address signals 24. The means for storing address signals 24 then energizes the input circuit of the decoding circuit 22 with the stored A-syllable address signals. The decoding circuit 22 addresses the encoding circuit 30, and new translated address signals stored in the addressed memory location of the encoder circuit 30 are shifted out in parallel and stored in the means for storing address signals 24. At this point both the original A-syllable address signals and the translated A-syllable address signals are stored in the means for storing address signals 24.

The O-syllable of an instruction specifies if an address is to be translated. The instruction register unit 18 now provides a signal to the means for storing address signals 24 which specifies whether the A-syllable address is to be translated or not.

Assume the A-syllable address is not to be translated. The A-syllable address signals are used to energize the decoding circuit 22 which in turn develops a decoded address signal for the read switches 12. The output circuit of the addressed memory location is then connected to the input circuit of the arithmetic unit 16 and an A-operand, stored in the addressed memory location of the memory unit 10, is serially read out and stored in the arithmetic unit 16.

However, if the signal from the instruction register unit 18 specifies that the A-syllable address is to be translated, then the means for storing address signals 24 uses the translated address signals to energize the decoding circuit 22 and thereby address the read switches 12.

After the A-operand is shifted into the arithmetic unit 16, the instruction register unit 18 shifts out the B-syllable address, stores it in the means for storing address signals 24 and the above described operation is repeated for storing a B-operand in the arithmetic unit 16.

With both the A and B operands stored in the arithmetic unit 16 the order specified by the O-syllable of the instruction is executed by the arithmetic unit 16.

When the operation specified by the O-syllable is complete, the instruction register unit 18 shifts out the C-syllable address for storage in the means for storing address signals 24. As described above for the A and B-syllable addresses, the means for storing address signals 24 then uses the C-syllable address to address the encoding circuit 22 and obtain translated C-syllable address signals. The C-syllable address signals or translated C-syllable address signals, depending on the order syllable, are then used to address the write switches 14 causing the input circuit of the addressed memory location of the memory unit 10 to be connected to the output circuit of the arithmetic unit 16. The result of the arithmetic operation is then serially shifted out of the arithmetic unit 16 and written in the addressed memory location of the memory unit 10.

The translated address signals stored in the encoder circuit 30 are changed by a special instruction during the time an order is normally being executed by the arithmetic unit 16. Two instructions are required to change each translated address signal stored in the encoder circuit 30. One instruction is required to generate the address of the encoder circuit 30 where new translated address signals are to be stored and to generate the new translated address signals. The next instruction is a special change translated addresses instruction causing a single new translated address to be stored in the encoder circuit 30.

DETAILED DESCRIPTION—TRANSLATE ADDRESS

With the general operation of the computer system of FIG. 1 in mind, refer to the details thereof shown in the schematic diagram of FIG. 2. The portion of the computer shown in FIG. 2 illustrates address translation.

*Word structure*

Before describing the circuits of FIG. 2 in detail, a brief description will be given of the word structure of instructions stored in the memory unit 10 with reference to the diagram of FIG. 8. The instructions of the computer system are broken down into A, B, C and O syllables as discussed in the general description and each have twenty-two digital binary bits of information. The binary bits of information may be observed at the output of the memory unit 10, at predetermined times described below, as combination of high and low pulse signals representing binary "1" and "0" digits.

FIG. 8 shows each of the syllables arranged by binary bit from left to right in the order in which they are shifted out from the memory unit 10. Further, each bit it identified by a digit period or particular time interval at the top of FIG. 8 to indicate the timing interval during which each bit is shifted out of memory unit 10. Digit periods will be defined herein during the dicussion of the timing unit 20.

Refer now to the address syllables. The first three bits of an address syllable identify it. The fourth bit is a space bit. The bits five through ten represent addresses of memory locations in the memory unit 10. The bits eleven through twenty-two are space bits.

Refer now to the order syllable wherein, similar to the address syllables, the first three bits identify it. The fourth bit of the order syllable specifies whether an address stored in the encoder circuit 30 is to be changed during the instruction. The bits five, six and seven of the order syllable specify whether the A, B or C syllables, respectively, are to be translated. The bits eight through twenty-two of the order syllable specify type of arithmetic operations to be performed by the arithmetic unit 16. The word structure of the result word to change translated addresses is discussed herein during the discussion of FIG. 7.

*Memory system*

The memory unit 10 has 64 memory locations for storing binary coded digital signals. Each of the memory locations has a plurality of memory cells for storing binary bits of digital information. For purposes of illustration, each memory location has twenty-two memory cells for storing twenty-two binary bits of coded signals. A group of twenty-two bits of coded signals will be referred to as one word of information. The memory unit 10 has 64 input and output circuits.

The memory locations of the memory unit 10 are magnetostrictive delay line units in which signals are stored as acoustic pulses by continually recirculating them from an output transducer, connected to one end of the delay line, back to an input transducer, connected at the other end of the delay line. The recirculating delay line system may be provided with conventional switching circuits such as flip-flop circuits for reading, writing, and erasing information into and out of the acoustic delay lines, or alternatively may be in the form shown in our copending patent application bearing Serial No. 41,550 and filed on July 8, 1960.

Referring to FIG. 2 the read and write switches 12 and 14 connect the input and outputs circuits, respectively, of the memory unit 10 to read and write buses, connected to other circuits in the computer system. There are three read buses, designated read bus #1, read bus #2, and read bus #3. The read switches 12 in the form described in the above identified patent application are a coincident current type of selection matrix in which one of a set of three lines, designated ½-select read lines #1, #2 and #3, must be energized with a ½-select current signal in coincidence with a ½-select current signal on one of sixty-four ½-select address lines 23 from the decoding circuit 22 in order to establish a connection between one of the output circuits of the memory unit 10 and the read buses #1, #2, and #3, respectively. The write switches 14 are similar to the read switches 12 except that a ½-select current signal on the ½-select address lines 23 from the decoding circuit 22 and a ½-select signal on a ½-select read #1 line together establish a connection between a write bus, designated write bus #1, and one of the input circuits of the memory unit 10.

The signals on the ½-select address lines 23 from the decoding circuit 22 are address signals which determine which one of the output circuits of the memory unit 10 is to be connected to a read bus by the read switches 12. The signal provided on the ½-select read lines #1, #2, and #3 determines which one of the three read buses #1, #2, and #3, respectively, is to be connected to the addressed output circuit of the memory unit 10. Similarly, the address signals on one of the ½-select address lines 23 to the write switches 14 determine which one of the input lines of the memory unit 10 is to be connected to the write bus #1. The signal on the ½-select write line #1 establishes the connection between the write bus #1 and the selected input circuit of the memory unit 10.

Once a connection is established through the read switches 12 to an output circuit of the memory unit 10, the twenty-two signal bits stored in the corresponding memory location are shifted out in series as high and low potential signals and then the connection is broken by internal timing circuits (not shown). Similarly, once a connection is established through the write switches 14 to the input circuit of the selected memory location, the connection remains established long enough to allow twenty-two signal bits of information applied to the write bus #1 to be shifted in and stored in the memory unit 10, then the connection is broken.

Although the read and write switches 12 and 14 are described herein as multi-aperture core units, it should be understood that other types of read and write switches may be used, for example, diode gating circuits or transistor switching circuits. Also, the memory unit 10 may be a magnetic drum memory unit or a magnetic core memory unit or other memory devices. It should also be understood that the read and write switches 12 and 14 could be an integral part of the memory unit 10.

*Instruction register*

Figure 3:
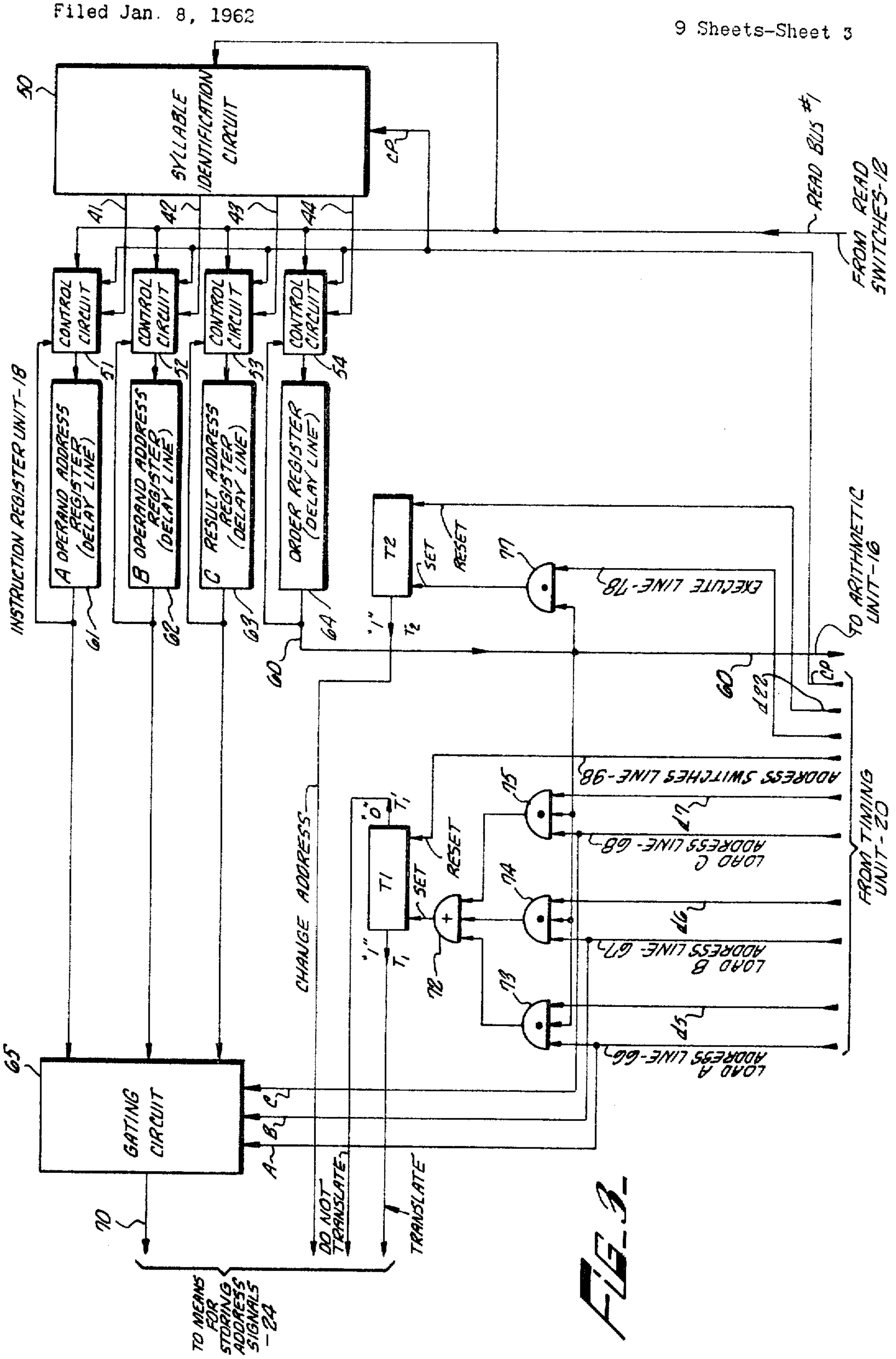
FIG. 3 is a block diagram, partly in schematic diagram form, of an instruction register unit for use in the computer system of FIGS. 1, 2, and 7.

Refer now to the instruction register unit 18 as shown in FIG. 3. The read bus #1, connected to the output circuit of the read switches 12, is connected in series circuit relation to an input circuit of a syllable identification circuit 50. The identification circuit 50 is synchronized to clock pulses from the timing unit 20 and has gating circuits and flip-flop circuits (not shown) for storing and identifying the first three signal bits of the syllable applied to the read bus #1. The identification circuit 50 has four control lines 41 through 44 connected to its output circuit which normally do not have a signal thereon. Whenever A, B, C and O syllables are shifted out of the memory 10 and identified, the identification circuit 50 develops a signal on control lines 41, 42, 43 and 44, respectively. Whenever a syllable is identified a signal is developed on the corresponding control line during each of the following eighteen clock pulses. The details of a similar syllable identification circuit are shown and described in a copending application entitled Programmable Computer System, bearing the Serial Number 142,095, and filed on October 2, 1963 in the name Glaser et al.

The instruction register unit 18 also has four recirculating registers. These recirculating registers include A and B operand address registers 61 and 62, a C result address register 63, and an order register 64, for storing the corresponding syllables of an instruction. The register circuits are delay line storage units similar to those used in the memory unit 10. The register circuits 61 through 64 have inputs circuits and output circuits connected to control circuits 51 through 54. The control circuits 51 through 54 are gating circuits and flip-flop circuits and receive clock pulses at a CP output circuit of the timing unit 20 for synchronizing and controlling the signal recirculation through the delay lines. Another input circuit of each of the control circuits 51 through 54 is connected to the control lines 41 through 44, respectively. Whenever the syllable identification circuit 50 develops a signal on one of the control lines 41 through 44, it causes the associated control circuit to disconnect the output circuit of the associated register circuit from its input circuit. At the same time, a connection is established between the read bus #1 and the input circuit of the associated register circuit. During the time a signal is applied on a control line to a control circuit all signals applied to the read bus #1 are serially shifted in and stored in the associated register circuit.

The output circuit of the order register 64 is connected to a line 60 which is connected to an input circuit of the arithmetic unit 16. The output circuits of the registers 61, 62 and 63 are connected to input circuits of a gating circuit 65.

The gating circuit 65 is a diode gating circuit for selectively connecting the output circuits of the register circuits 61 through 63 to an output line 70. The gating circuit 65 has three input circuits for controlling its operation. One input circuit is connected to a load A address line 66. Whenever a signal is applied on the load A address line 66, a connection is established between the output circuit of the A address register 61 and the output line 70. Similarly, the other two input circuits are connected to a load B address line 67 and a load C address line 68. A signal on the lines 67 and 68 causes the gating circuit 65 to establish a connection between the output circuits of the B and C address registers 62 and 63 and the output line 70.

Two timing flip-flop circuits are provided in the instruction register 18, rather than the timing unit 20 for convenience. The timing flip-flops include a translate address flip-flop T1 and a change address flip-flop T2.

The translate address flip-flop has its input circuit for setting it into a "1" state, connected to an output circuit of an "or" gating circuit 72.

The "or" gating circuit 72 has three input circuits connected to "and" gating circuits 73, 74 and 75. The "and" gating circuit 73 has input circuits connected to the load A address line 66, a $d5$ output circuit of the timing unit 20 and the line 60. The input circuits of the "and" gating circuit 74 are connected to the load B address line 67, a $d6$ output circuit of the timing unit 20 and the line 60. The input circuits of the "and" gating circuit 75 are connected to the load C address line 68, a $d7$ output circuit of the timing unit 20 and the line 60. The input circuit og the translate address flip-flop circuit T1 for resetting it to a "0" state is connected to an address switches line 98.

The output circuit of the translate address flip-flop circuit T1, which provides a predetermined output signal when the flip-flop circuit T1 is in a "1" state is called the $T_1$ output circuit. The output circuit which provides the identical output signal when the flip-flop circuit T1 is in a "0" state is called the $T_1'$ output circuit. To be explained, whenever the translate address flip-flop T1 is in a "1" state and a signal is developed at the output circuit $T_1$, syllable address signals are translated.

The change encoder address flip-flop circuit T2 has its input circuit for setting it to a "1" state connected to an "and" gating circuit 77. The "and" gating circuit 77 has its input circuits connected to the output line 60 and an execute line 78. The execute line 78 is connected to an output circuit of the timing unit 20. The input circuit of the change encoder address flip-flop T2 which resets it into a "0" state is connected to a *d*22 output circuit of the timing unit 20. Whenever the change encoder address flip-flop T2 is in a "1" state, a signal is developed at an output circuit thereof designated $T_2$, which designates that an encoder address is to be changed.

*Program sequence counter*

The program sequence counter 28 (FIG. 2) is a conventional ring counter which counts through a plurality of states in response to timing pulses applied to a load buffer register line 84. The program sequence counter 28 provides high and low digital output signals in parallel corresponding to the state thereof.

*Means for storing address signals*

The output line 70 of the gating circuit 65 (see FIG. 3) is connected in series to an input circuit of a buffer register 80, in the means for storing address signals 24. The buffer register 80 is also connected in a parallel circuit arrangement to the output circuit of the program sequence counter 28. The buffer register 80 has two control circuits connected to load buffer register lines 84 and 85. The buffer register 80 has conventional diode gating and flip-flop circuits for reading and storing the signals from the program sequence counter 28 in parallel and the signals on the line 70 in series.

A gating circuit 82 is provided and connected in a parallel circuit arrangement to the input circuit of the decoding circuit 22. The gating circuit 82 has a control circuit connected to an output circuit of an "or" gating circuit 86.

The means for storing address signals 24 also has a translate buffer register 88 including gating and flip-flop circuits. The translate buffer register 88 has an input circuit connected in parallel to the output circuit of the encoder circuit 30. The translate buffer register 88 also has a control circuit connected to an address encoder line 90.

The output circuit of the translate buffer register 88 is connected in parallel to an input circuit of a gating circuit 92. The gating circuit 92 is a conventional diode gating circuit with a control circuit connected to an output circuit of an "and" gating circuit 94. The output circuit of the gating circuit 92 is connected in parallel to the input circuit of the decoding circuit 22.

The "or" gating circuit 86 has input circuits connected to the address encoder line 90 and the output circuit of an "and" gating circuit 96. The "and" gating circuit 96 has input circuits connected to the output circuit $T_1'$ of the translate encoder address flip-flop circuit T1 (see FIG. 3) and an address switches line 98. The "and" gating circuit 94 has its input circuits connected to the $T_1$ output circuit of the translate address flip-flop circuit T1 and the address switches line 98.

With the arrangement of the circuits of the means for storing 24 in mind, refer briefly to its operation.

The buffer register 80 operates as a shift register in response to signals on the load buffer register line 85 to serially shift in and store signals applied on the output line 70. In contrast, whenever a signal is applied on the load buffer register line 84, the buffer register 80 reads and stores the output signals of the program sequence counter 28 in parallel.

The translate buffer register 88 is responsive to a signal on the address encoder line 90 to read and store the high and low potential digital output signals of the encoder circuit 30.

The gating circuit 82 is responsive to a high potential signal from the "or" gating circuit 86 to connect the output circuit of the buffer register 80, in parallel to the input circuit of the decoder circuit 22 and thereby energize the decoder circuit 22 with signals corresponding to those stored in the buffer register 80.

The gating circuit 92 is responsive to a signal from the

"and" gating circuit 94 to connect the output circuit of the translate buffer register 88 in parallel to the input circuit of the decoding circuit 22 and thereby energize the decoding circuit 22 with signals corresponding to those stored in the translate buffer register 88.

Whenever the change encoder address flip-flop circuits T1 is in a "0" state and there is a signal at the output circuit $T_1'$ and simultaneously a signal is applied to the address switches line 98, the "and" gating circuit 96 and, therefore, the "or" gating circuit 86, develop a signal. The gating circuit 82 is responsive to the signal to connect the output circuit of the buffer register 80 to the input circuit of the decoder circuit 22. Similarly, whenever the change encoder address flip-flop circuit T1 is in a "1" state and a signal is applied at the $T_1$ output circuit thereof, and simultaneously a signal is applied on the address switches line 98, the "and" gating circuit 94 develops a signal causing the gating circuit 92 to connect the output circuit of the translate buffer register 88 to the input circuit of the decoder circuit 22.

*Decoder*

The decoder circuit 22 has a control circuit connected to the address encoder line 90. The decoder circuit 22 receives binary coded input signals from the output circuits of the gating circuits 82 and 92, and provides a pulse of current on one of one hundred twenty-eight ½-select address lines, depending on the binary coded input signals and the potential on the address encoder line 90. Sixty-four of the ½-select address lines are referenced by the number 32 and are connected to the input circuit of the encoder circuit 30. The other sixty-four ½-select address lines are the ½-select address lines 23, connected to the input circuits of the read and write switches 12 and 14.

Refer now to the operation of the decoder 22. Whenever the gating circuit 92 or the gating circuit 82 connects the output circuits of the buffer register 80 or the translate buffer register 88 to the input circuit of the decoder circuit 22 and simultaneously there is a signal on the address encoder line 90, the decoder circuit 22 develops an output signal on one of the ½-select address lines 32 to the encoder 30. In the absence of a signal on the address encoder line 90, the decoder circuit 22 provides a signal to the read and write switches 12 and 14 on one of the ½-select address lines 23. The coded input signals to the decoder circuit 22 determines which of the ½-select address lines in 23 and 32 the output signal will be provided on.

The decoder circuit 22 must have a circuit arrangement which provides a current output signal on one of the lines of 32 and 23 of sufficient magnitude to energize core units either in the encoder circuit 30 or the read and write switches 12 and 14. A decoding circuit such as the decoding circuit 22 described above is shown and described in a copending application assigned to the same assignee as this application and bearing Serial No. 13,194 and filed on March 7, 1960 and now Patent No. 3,141,158.

*Encoder*

Refer now to the encoder circuit 30 with reference to FIG. 4–A. The coder circuit 30 has a matrix of sixty-four columns and six rows of multi-apertured core units 100. Each core unit with associated windings has a rectangular hysteresis loop. Each column of core units 100 is a memory location in the encoder circuit 30 and each of the six cores in a column is a memory cell for storing a binary bit of information.

Each of the core units 100 has a large aperture 101 and a small aperture 102. One of the ½-select address lines 32, designated line #1, is coupled through an isolation diode 104, to a block line 105. The block line 105 is threaded through the large aperture in each of the core units 100 in the first column to an input circuit of a block control circuit 106. The line #1 of the ½-select address lines 32 is also coupled through another isolation diode 108 to a read and write line 110. The read and write line 110 is threaded through the small aperture in each of the core units 100 in the first column and then back through the large aperture of each of the core units in the first column to an input circuit of a read and write control circuit 112. The isolation diodes 104 and 108 are silicon diodes and are poled with their cathodes connected to the lines 105 and 110. The other sixty-three ½-select address lines 32 designated lines #2 through #64 are also connected through other isolation diodes 104 and 108 to block lines 105 and read and write lines 110 in each of the other columns identical to the first column. The other ends of all block lines 105 are connected in common and are connected to the same input circuit of the block control circuit 106 as the line 105 in the first column. The other ends of each of the read and write lines 110 from the isolation diodes 108 are connected in common and are connected to the same input circuit of the read and write control circuit 112 as the line 110 in the first column.

A bias line 114 for magnetically biasing the core units 100 is threaded in series through the large aperture of each of the core units 100. The ends of the bias line 114 are connected to an output circuit of a source of direct-current 116.

A reset line 118 is also serially threaded through the small aperture of each of the core units 100 and has its ends connected to an output circuit of a reset signal generator 115.

The sense lines 34, to the translate buffer register 88 and which are numbered #1 through #6 are threaded through the large aperture of the core units 100 in each of the rows. The other ends of the sense lines 34 from the buffer register 88 are connected together to a source of reference potential 120.

Write lines designated by the general symbol 119 are numbered #1 through #6 and are threaded through the large aperture of the core units 100 in each of the rows. One of the ends of each of the write lines 119 are connected together to a power supply 117. The other ends of the write lines 119 are connected to an input circuit of the means for storing address signals 24.

The read and write control circuit 112 is a switching circuit having an input circuit connected to an "or" gating circuit 122. The "or" gating circuit 122 has input circuits connected to the address encoder line 90 and a write control line 125.

The block control circuit 106 and the reset signal generator 115 are switching circuits having control circuits connected to a block control line 123 and the $d4$ output circuit of the timing unit 20. To be described in detail in connection with FIG. 7 the lines 123, 125 and 119 are connected to the means for storing address signals 24 and are used during the change encoder address period of operation.

Refer now to the operation of the encoder 30. The multi-aperture core units 100 will be described herein as having three different stable magnetic states as illustrated in FIG. 4–B and are called a block state, a set state and a partial set state. The block state is said to represent a binary digit "0" whereas a set state is said to represent a binary digit "1."

Refer now to FIG. 4–B. A block state is defined as the magnetic state wherein a multi-aperture core unit has all flux therein saturated in a clockwise direction. A set state is defined as the magnetic state wherein a multi-aperture core unit has flux saturated in a counter clockwise direction in a path around the small aperture of the core and the net saturation in a path around the large aperture is zero. A partial set state is identical to a set state except the direction of saturation around the small aperture is reversed from that of a set state.

FIG. 4–B also illustrates the sequence of operation and the direction of flux saturation during both a write and a read cycle. Refer first to the write cycle. As indicated in FIG. 4–B a core unit 100 may initially be in either a set state or a block state. Three steps are required to write information, or change the translated addresses stored in the encoder 30. First, all the cores in a column must be blocked; information signals are then stored; and finally the cores must be set into a final state ready for a read cycle.

Assume that a particular core is to be set into a set state or a binary digit "1" is to be stored therein. First a signal is developed on one of the ½-select address lines 32 and simultaneously a signal is developed on the block control line 123. The block control circuit 106 allows current to flow on the block line 105 having sufficient magnitude and in a direction such that all the cores 100 in the selected column of the encoder 30 are set into a block state regardless if initially in a set state or a block state.

Next a ½ select current signal is developed on the one of the write lines 119 which links the core ultimately to be set into a set state. Simultaneously, another signal is developed on the ½ select address line 32 linking the column of cores to be written in and a signal is developed on the write control line 125. The signal on the write control line 125 causes the read and write control circuit 112 to switch into a low impedance condition. The read and write lines 110 and the write lines of 119 are poled in such a direction and the current flowing thereon is such that the core being set to a set state is saturated into a partial set state.

Subsequently, a signal is developed at the $d4$ output circuit causing the reset signal generator 115 to develop a current signal on the reset line 118. The reset line 118 is poled and the current thereon is such that the core, in a partial set state, is saturated into a set state.

The operation of the encoder 30 during the write cycle wherein a core is being set to a block state is similar to that wherein a core is set to a set state. The only difference is that after the signal is developed on the block line 105 and all cores are saturated to a block state, a current signal is only developed on the read and write line 110 linking the particular core and current is not applied on the write line of 119 linking the particular core. The subsequent current signal on the reset line 118 has no effect on the core in a block state.

Thus, the sequence of operation of the encoder 30 during a write cycle is always the same. First all cores in a column or memory location are cleared to a block state. Then the particular column or memory location into which a translated address is to be stored is energized with a current signal on the corresponding read and write line 110. Simultaneously, those cores to be set to a set state receive a current signal on the corresponding write line of 119. Those cores finally to be in a block state do not receive a signal on a write line of 119. Next a reset signal is developed on the reset lines 118. The cores in a partial set state are saturated into a set state. Those cores in a block state are unchanged and remain in a block state.

The source of current 16 continuously supplies a current signal to the bias line 114 which is poled such that the current thereon biases the cores towards a set state. This allows the cores to be written into much faster.

Consider the operation of the encoder 30 during a read cycle. Two steps are required to read. First a read signal is developed then a reset signal is developed.

Initially during a read cycle a signal is developed simultaneously on the line 90 and on the ½ select address line of 32 linking the column or memory location from which a translated address is to be read out. The signal on line 90 causes the read and write control circuit 112 to go into a low impedance condition and allow current to flow from the ½ select address line of 32, receiving a signal, to ground via the column selected by 32 and the read and write control circuit 112. The read and write line 110 is poled and the current therein is in such a direction and of sufficient magnitude that the cores in a set state are set to a partial set state and the block cores are unchanged.

After the signal on line 90 and on one of the ½ select address lines 23 a signal is developed at the output circuit *d*4 of the timing unit 20. This causes a reset signal on the reset line 118 and the partial set cores are restored to a set state ready for another read cycle but the blocked cores are unaffected.

During the read cycle, output signals are developed on the sense lines of 34 only by those cores which are initially in a set state. This occurs during the read cycle both during the time interval the core is switched to a partial set state and during the time interval when a partial set core is switched back to a set state. The signal on the address encoder line 90 causes the translate buffer register 88 to read the signals on the sense lines 34 only when cores are switched from a set to a partial set state. During the read cycle those cores which are initially in a blocked state do not change flux state and, therefore, do not induce a signal on the corresponding sense line of 34.

Other details of the theory of operation of multi-aperture core units are discussed in an article entitled "Current Steering in Magnetic Circuits," written by J. A. Rachman and H. D. Crane and appearing on pages 21 through 30 of the March 1957 issue of the IRE Transactions on Electronic Computers.

*Arithmetic unit*

Referring now to FIG. 5, the arithmetic unit 16 has A and B operand registers 124 and 126 for storing the A and B operands for arithmetic computations. Also provided is a C result register 128 for storing the result of an arithmetic computation. The registers 124, 126 and 128 have control circuits 130, 132 and 134, respectively, connected to their input circuits and to their output circuits. The registers 124, 126 and 128 are magnetostrictive delay line memory circuits similar to those in the memory unit 10, and in conjunction with the control circuits 130, 132 and 134 form recirculating register circuits similar to those in the instruction register unit 18.

The control circuit 130 has its input circuit, for receiving new information, connected to the read bus #2. The input circuit of the control circuit 130 is connected to the ½-select read #2 line. The control circuit 132 has its input circuit, for receiving new information, connected to the read bus #3 and has its input control circuit connected to the ½-select read #3 line. In contrast to the control circuits in the instruction register unit 18, which require a continuous control signal, whenever a pulse signal is applied to the ½-select read #2 line, the control circuit 130 is operative to disconnect the output circuit of the A operand register 124 from its input circuit and connect the read bus #2 to the input circuit thereof. The control circuit 130 has timing circuits and gating circuits (not shown) for holding the connection between the read bus #2 and the input circuit of the A operand register 123 for twenty-two clock pulses. After twenty-two clock pulses the connection is broken. After the connection between the read bus #2 and the input circuit of the A operand register 124 is broken, the output circuit of the A operand register 124 is connected back to its input circuit.

The control circuit 132 and its operation is identical to that of the control circuit 130.

The output circuits of the A operand register 124 and the B operand register 126 are connected to input circuits of an adder circuit 136. The adder circuit 136 operates under the control of an arithmetic control circuit 138 to perform arithmetic operations on operands stored in the A and B operand registers 124 and 126.

The control circuit 134 has its input control circuit connected to the arithmetic control circuit 138. Whenever result signals from an arithmetic operation are to be shifted into the C result register 128, the arithmetic control circuit 138 provides a pulse signal to the control circuit 134. The result signals are then serially shifted from the added circuit 136 and stored in the C result register 128.

The arithmetic control circuit 138 has an input circuit connected to an execute line 140, which is connected to an output circuit of the timing unit 20. An input circuit of the arithmetic control circuit 138 is also connected to the line 69 from the order register 64 of the instruction register 18. The arithmetic control circuit 138 is responsive to a high potential signal on the execute line 140 to cause the adder circuit 136 to execute the order specified by the O syllable stored in the order register 64. Orders are executed in a conventional manner known in the computer art.

The arithmetic control circuit 138 also has an output circuit connected to a ready line 142. The ready line 142 is connected to an input circuit of the timing unit 20. When an order is executed the arithmetic control circuit 138 develops a ready signal on the line 142. The ready signal is applied to the line 142 for twenty-two clock periods. To be explained, the ready signal causes the timing unit 20 to sequence the computer system and thereby cause the result of the arithmetic operation, stored in the C result register 128, to be stored in the memory unit 10.

*Timing unit*

Refer now to FIG. 6–A. The timing unit 20 has a pulse generator 143 which contains a crystal oscillator (not shown) and wave-shaping circuits for developing rectangular reoccurring clock pulses at an output circuit CP. The clock pulses synchronize the operations of the circuits in the computer system of FIG. 1 as described.

The pulse generator 143 also has a ring type counter (not shown) which counts clock pulses. The ring type counter counts from a state one to a state twenty-two and then recycles to state one again. In the following discussion the states of the counter in the pulse generator 143 and time intervals corresponding thereto will be referred to as digit periods.

Gating circuits (not shown) are also provided for developing timing pulses, at the beginning of digit periods one, four, five, six, seven, seventeen, eighteen, twenty-two, five through ten, and eleven through sixteen, at the output circuits designated d1, *d*4, *d*5, *d*6, *d*7, *d*17, *d*18, *d*22, *d*5–*d*10, and *d*11–*d*16, respectively.

The timing unit 20 also includes an instruction counter 144, an operand counter 146 and a result counter 148, which are connected together to form a ring counter. The counters are connected to the *d*1 and *d*22 output circuits of the pulse generator 143 and count from one state to the next in response to pulses at the output circuit *d*22.

Each output circuit of the counters 144, 146 and 148 have an output gating circuit including a special circuit for developing an output pulse only during the first digit period one after the counter has stepped into a particular state.

FIG. 6–B shows a schematic diagram of a special circuit which includes a differentiating circuit 153 connected to the input circuit of an "and" gating circuit 159. The "and" gating circuit 159 has an input circuit connected to the output circuit *d*1 of the pulse generator 153. The differentiating circuit 153 has its input circuit connected to the output circuit corresponding to a particular state of the counter.

Each time a counter steps into a particular state and provides a signal at the corresponding output circuit the differentiating circuit connected thereto differentiates the signal such that the signal is applied to the connected "and" gating circuit 159 for less than twenty-two digit periods. The signal at *d*1 causes an output pulse from the "and" gate 159 during digit period 1 and since the output of the differentiating circuit terminates before the next digit period one, only one output pulse is developed each time a counter steps into a state.

The instruction counter 144 has thirteen states of operation through which it sequentially counts. When the instruction counter 144 steps into state thirteen it remains in state thirteen until a pulse signal is received on an input line 165. When the instruction counter 144 is in state thirteen, a pulse is developed at *d*22 and a pulse signal is received on the input line 165, it immediately counts into state one. When in state one the instruction counter 144 starts counting the pulses at *d*22 again, sequentially counting through states one through thirteen.

The instruction counter 144 has four output circuits from "and" gating circuits 159 described hereinabove. The output circuits are connected to the load buffer register line 84, a line 152, the ½-select read #1 line and a line 164. The instruction counter 54 generates a pulse signal on the load buffer register line 84 during the first digit period one after the instruction counter 144 steps into states one, four, seven and ten. Gating circuits are also provided for generating a pulse signal on the output line 152 during the first digit period one after the instruction counter 144 steps into states two, five, eight and eleven. Similarly, gating circuits in the instruction counter 144 develop an output pulse on the ½-select read #1 line during the first digit period one after the instruction counter 144 steps into states three, six, nine and twelve. A pulse signal is also developed on the line 164 the first digit period one after the instruction counter 144 steps into state thirteen.

The operand counter 146 is similar to the instruction counter 144 and has an input circuit connected to the line 164. The operand counter 146 has eight states of operation, called states fourteen through twenty-one. Similar to the instruction counter 144 the operand counter has seven output circuits connected to lines 154 and 155, the ½-select read #2 line, lines 157 and 158, the ½-select read #3 line and the line 140 and develops an output pulse on these lines the first digit period one after it counts into states fourteen through twenty-respectively. When the operand counter counts into state twenty-one it stops counting pulses at the *d*22 output circuit until a pulse signal is developed on the line 164. When a pulse signal is developed on the line 164 the operand counter counts from state twenty-one into state fourteen and repeats the counting operation.

The result counter 148 is also similar to the instruction counter 144 and has four states of operation. The result counter 148 counts from a state designated state twenty-two to states designated twenty-three, twenty-four and twenty-five in response to pulses at the *d*22 output circuit of the pulse generator 143. The result counter 148 has four output circuits connected to output lines 161 and 162, the ½-select write #1 line, and line 165, and a pulse signal is developed on these lines during the first digit period after stepping into states twenty-two through twenty-five, respectively. When the result counter 148 counts into state twenty-five, it remains in state twenty-five until a high potential signal is received at the input line 142 simultaneously with a pulse at the *d*22 output circuit and then it steps into state twenty-two and repeats the counting cycle.

An output circuit of an "or" gating circuit 170 is connected to the address switches line 98. The "or" gating circuit 170 has input circuits connected to the ½-select read lines #1 #2 and #3 and the ½-select write #1 line. Thus, whenever a pulse signal is developed on the ½-select read lines #1, #2 or #3, or the ½-select write #1 line, an output pulse is developed on the address switches line 98.

The lines 154, 157, 161 and 140 are connected to input circuits of monostable multivibrators 171 through 174, respectively. The monostable multivibrators 171 through 174 are normally in a "0" state. When a high potential input signal is received by one of the monostable multivibrators 171 through 174 it is triggered into a "1" state and remains there for ten clock periods and then automatically returns to a "0" state. Whenever a monostable multivibrator is in a "1" state, it provides a high potential output signal at an output circuit. To be explained, the monostable multivibrator 171, 172 and 173 selectively allow bits five through ten of the A, B and C-syllables to be shifted into the buffer register 80. The monostable multivibrator 174 causes the signal to be developed on the execute line 78.

The output circuits of the monostable multivibrators 171 through 174 are connected to input circuits of "and" gating circuits 175 through 178, respectively. Another input circuit of the "and" gating circuits 175 through 177 is connected to the *d*5–*d*10 output circuit of the pulse generator 143. The "and" gating circuit 178 has another input circuit connected to the *d*4 output circuit of the pulse generator 143.

Thus, whenever the monostable multivibrators 171 through 173 are in a "1" state, the output circuit of the "and" gating circuits 175 through 177 receive a signal at the pulse signal occurring at the beginnings of the digit periods five through ten. Similarly, whenever the monostable multivibrator 174 is in a "1" state, the "and" gating circuit 178 will provide a signal at the pulse signal occurring at the beginning of digit period four.

The output circuits of the "and" gating circuits 175, 176, and 177 are connected to the load A, B and C address lines 66, 67 and 68. The output circuit of the "and" gating circuit 178 is connected to the execute line 78.

The lines 152, 155, 158 and 162 are connected to an input circuit of an "or" gating circuit 180. The output circuit of the "or" gating circuit 180 is connected to the address encoder line 90.

The load A, B and C address lines 66, 67 and 68 are all connected to the input circuit of an "or" gating circuit 182. The output circuit of the "or" gating circuit 182 is connected to the load buffer register line 85.

*Operation of computer system during address translation*

With the detailed description of the computer system of FIG. 2 in mind, an example will be given illustrating its operation. Assume that translated address signals have been stored in the encoder circuit 30 in the appropriate memory locations and that instruction signals and operand signals have been stored in the memory unit 10 in their appropriate memory locations. Also assume initially the program sequence counter 28 is set into an initial state, the instruction counter 144 is set into state one, the operand counter 146 is set into state twenty and the result counter 148 is set into state twenty-five by reset circuitry (not shown) in a conventional manner. Also assume this same reset circuitry triggers both the translate address flip-flop circuit T1 and the change encoder address flip-flop circuit T2 into their "0" states.

During digit period one, while the instruction counter 144 is in state one, a pulse signal is developed on the load buffer register line 84, causing the buffer register 80 to read the output signals of the program sequence counter 28, and the program sequence counter 28 to be stepped into its next state. Signals corresponding to the former state of the program sequence counter 28 are now stored in the buffer register 80. During digit period twenty-two the instruction counter 144 is pulsed into state two.

During digit period one, while the instruction counter 144 is in state two, a pulse signal is developed on the address encoder line 90, causing the gating circuit 82 to gate the output signals of the buffer register 80 to the input circuit of the decoding circuit 22. The signals on the address encoder line 90 cause the signals from the gate 82 to be used by the decoding circuit 22 to address the corresponding memory location in the encoder circuit 30. The encoder circuit 30 then shifts out translated address signals from the addressed memory location on the sense lines 34. The signals on the sense lines 34 are then automatically read and stored in parallel by the translate buffer register 88.

During the following digit period twenty-two the instruction counter 144 is pulsed into state three, and during the next digit period one a pulse signal is developed on the ½-select read #1 line and, therefore, on the address switches line 98. Since the translate address flip-flop T1 was initially set into a "0" state, the gating circuits 96 and 86 cause the gating circuit 82 to connect the output circuit of the buffer register 80 to the input circuit of the decoding circuit 22. The decoding circuit 22 then develops a ½ select current signal on one of the ½-select address lines 23 in coincidence with the pulse signal developed on the ½-select read #1 line and establishes a connection between the input circuit of the memory location specified by the address signals stored in the buffer register 80 and the read bus #1.

Assume that the A, B, C and O-syllables are stored in this order in the memory 10. Also assume the first addressed memory location is the address of the A-syllable. During the following digit periods of state three of the instruction counter 144 the A-syllable is shifted out in series on the read bus #1 and stored in the appropriate one of the A address registers 61.

During the next digit period twenty-two the instruction counter 144 is pulsed into state four, then into states five and six and the above described sequence of operation of the computer system is repeated, during which the B-syllable of the instruction is shifted out and stored in the address register 62. During states seven through twelve the C and O-syllables are stored in the registers 63 and 64, respectively.

When the instruction counter 144 is pulsed into state thirteen the operand counter 146 is pulsed from state twenty into state fourteen. During digit period one the monostable multivibrator 171 is pulsed into a "1" state. During digit periods five through ten, signals are developed on the load A address line 66.

Assume now that the bit five of the O-syllable stored in the order register 64 does not specify the A-syllable address is to be translated. During digit period five the output signal of the order register 64 will be a low potential. Therefore, gate 73 (see FIG. 3) will not cause the translate address flip-flop T1 to be set to a "1" state. During the digit periods five through ten the address bits of the A-syllable are shifted out from the instruction register unit 18 in series on line 70 and stored in the buffer register 80. The A-syllable address bits, which specify the address in memory 10 of the A operand, are now stored in the buffer register 80 and the operand counter 146 steps into state fifteen. This causes a pulse signal on the address encoder line 90 during digit period one. The pulse signal on the address encoder line 90 causes the encoder circuit 30 to be addressed by the signals stored in the buffer register 80 and to shift out translated address signals from the addressed memory location in parallel on the sense lines 34. The translated address signals on the sense lines 34 are then stored in the translate buffer register 88.

The operand counter 146 is then pulsed into state sixteen, and a pulse is developed on the ½-select read #2 line, causing a pulse signal on the address switches line 98. Since the translate address flip-flop T1 is in a "0" state, the gate 82 couples the A-syllable address signals stored in the buffer register 80 to the decoder circuit 22. The pulse signal applied to the ½-select read #2 line then causes the output circuit of the memory location specified by the A-syllable address in buffer register 80 to be connected to the read bus #2. The A operand in the addressed memory location is then shifted out on the read bus #2 and stored in the A operand register 124 in the arithmetic unit 16.

Assume now that the bit six of the order syllable specifies that the B operand address is to be translated. The operand counter 146 now steps into state seventeen, monostable multivibrator 172 is pulsed to a "1" state and during each of the digit periods five through ten a signal is developed on the load B address line 67. The address bits of the B syllable are shifted out of the B address register 62 in series and stored in the buffer register 80. During digit period six a signal is developed on line 60 by the order register 64, therefore, gate 74 (see FIG. 3) sets the translate address flip-flop T1 into a "1" state.

The operand counter 146 is now pulsed into state eighteen and a pulse signal is developed on the address encoder line 90 by gate 180. This causes the encoder circuit 30 to be addressed by the B syllable address bits stored in the buffer register 80. Translated B syllable address signals are shifted out of the addressed memory location in the encoder circuit 30 and are stored in the translate buffer register 88.

The operand counter 146 is now pulsed into state nineteen and a signal is developed on the ½-select read #3 line, therefore, on the address switches line 98. Since the O syllable stored in order register 64 specified that the B syllable address bits are to be translated, and the translate address flip-flop T1 is true, the signal on the address switches line 98 causes the gate 94 to energize gate 92 and the read switches 12 are addressed with the translated address signals stored in the translate buffer register 88 rather than the address signals in register 80. The ½ select current signal on the ½-select read #3 line establishes a connection between the addressed memory location and the read bus #3. During the following twenty-two digit periods the B operand is shifted out of the addressed memory location of the memory unit 10 and stored in the B operand register 126 of the arithmetic unit 16.

The operand counter 146 is pulsed into state twenty, causing a pulse signal on the execute line 140. The pulse signal on the execute line 140 causes the order specified by the O syllable, stored in the order register 64 to be executed. When the order has been executed and the result stored in the C result register 128, a signal is developed on the ready line 142 by the arithmetic control circuit 138. During the next digit period twenty-two the result counter 148 is pulsed from state twenty-five into state twenty-two.

During state twenty-two of the result counter 148 the C result address is serially shifted out of the C result address register 63 and stored in the buffer register 80. During state twenty-three of the result counter 148 the encoder circuit 30 is addressed by the C result address signals, stored in the buffer register 80, and the translated address signals are shifted out and stored in the translate buffer register 88. During state twenty-four of the result counter 148 the write switches 14 are addressed by the untranslated address signals stored in the buffer register 80 or the translated address signals stored in the translate buffer register 88, depending on bit seven of the order syllable. If bit seven specifies translation is to take place, the translated address signals are used to address the write switches 14. If bit seven specifies no translation, then the untranslated address signals are used.

In summary, address signals are shifted out of the instruction register unit 18 and stored in the buffer register 80. The address signals stored in the buffer register 80 are then used to address the encoder circuit 30 and translated address signals are shifted out of the addressed memory location of the encoder circuit 30 and stored in the translate buffer register 88. If the order syllable of the instruction stored in the instruction register unit 18 specifies that the address is to be translated the read switches 12 and the write switches 14 are addressed by the translated address signals stored in the translate buffer register 88. However, if the order does not specify that the address is to be translated, the untranslated address signals in the buffer register 80 are used to address the read switches 12 and the write switches 14.

DETAILED DESCRIPTION OF CIRCUITS TO CHANGE ENCODER ADDRESS

*Means for storing address signals*

With the computer system of FIG. 2 in mind for automatically translating address signals, a description of the system for changing the translated addresses in the encoder circuit 30 will be given with reference to FIG. 7. To be explained, translated addresses are stored in the encoder circuit 30 by special order during the time orders are normally executed by the arithmetic unit 16.

Refer now to the schematic diagram of FIG. 7 which shows the additional circuits necessary to change encoder 30 addresses. The buffer register 80 has another input control circuit than that shown in FIG. 2, connected to an output circuit of an "and" gating circuit 186. The "and" gating circuit 186 has two input circuits connected to the $T_2$ output circuit of the change encoder address flip-flop circuit T2 and the *d*5–*d*10 output circuit of the timing unit 20. The buffer register 80 also has an input circuit, for receiving digital signals in series, connected to the line 129, which is connected to the output circuit of the C register 128 of the arithmetic unit 16. Whenever the "and" gating circuit 186 develops a high potential output signal, the buffer register 80 is responsive thereto to serially shift in and store a single bit of the digital signals developed on the line 129, by the output circuit of the C register 128.

The translate buffer register 88 also has another input control circuit than that shown in FIG. 2, connected to an output circuit of an "and" gating circuit 188. The translate buffer register 88 also has an input circuit, for receiving serial digital signals, connected to the line 129. The "and" gating circuit 188 has input circuits connected to the $T_2$ output circuit of the change encoder address flip-flop circuit T2 and the *d*11–*d*16 output circuit of the timing unit 20. Whenever the "and" gating circuit 188 develops a high potential output signal, the translate buffer register 88 serially shifts in and stores a single bit of the digital signals applied to the line 129 by the C register 128.

The gating circuit 82 also has another input circuit than that shown in FIG. 2 which is connected to the output circuit of an "or" gating circuit 190. The "or" gating circuit 190 has input circuits connected to the output circuit of an "and" gating circuit 192 an output circuit of and "and" gating circuit 194. The "and" gating circuit 192 has input circuits connected to the $T_2$ output circuit of the change encoder address flip-flop T2 and the *d*17 output circuit of the timing unit 20. The "and" gating circuit 194 also has input circuits connected to the $T_2$ output circuit of the change encoder address flip-flop T2 and the *d*18 output circuit of the timing unit 20. The output circuit of the "and" gating circuits 194 and 192 are also connected to the block control line 123 and the write control line 125, respectively, which are connected to the block control circuit 106 and the read and write control circuit 112 (see FIG. 4–A).

The write lines 119 are connected between the input circuit of the encoder circuit 30 (see FIG. 4–A), and an output circuit of a gating circuit 200. The gating circuit 200 has an input circuit connected in parallel circuit arrangement to the output circuit of the translate buffer register 88. The gating circuit 200 also has an input control circuit connected to the "and" gating circuit 194. Whenever the gating circuit 200 receives a high potential input signal from the "and" gating circuit 194, it is operative to connect the output circuits of the translate buffer register 88 to the write lines 119 and, therefore, to the input circuit of the encoder circuit 30.

*Operation—Changing encoder addresses*

With the detailed description of the computer system of FIG. 7 in mind, an example will be given illustrating its operation when translated addresses in the encoder circuit 30 are changed.

As pointed out hereinabove, one arithmetic operation is required in order to generate signals representing the memory location in the encoder circuit 30 into which translated address signals are to be written and to generate signals representing the translated address signals that are to be written in that memory location. A second instruction is required to actually write the translated address signals into the encoder circuit 30. Translated address signals are written into the encoder circuit 30 during the time the arithmetic unit 16 normally executes orders.

Refer now to FIG. 8 wherein the word structure of the result word stored in the C register 128 is shown when translated address signals are to be stored in the encoder circuit 30. When a result word for changing encoder addresses is stored in the C register 128, the bits therein may be observed at the output thereof during the digit periods indicated at the top of FIG. 8. Proceeding from digit period one through twenty-two, the first four bits of the word in the C register 128 are space bits. The bits five through ten are the address of the memory location in the encoder circuit 30 into which the new translated address signals are to be stored. Bits eleven through sixteen are the translated address bits to be stored in the memory location of the encoder circuit 30 specified by the bits five through ten. The bits seventeen through twenty-two are space bits. Also, with reference to FIG. 8, it should be recalled that bit 4 of the order syllable specifies if the encoder addresses are to be changed.

Assume now that during the preceding instruction the O-syllable caused the arithmetic unit 16 to store a result word in the C-register 128 which is a result word for changing translated address signals in the encoder 30. Also assume that an O-syllable is stored in the O-register 64 which has a signal in bit position four that specifies that addresses are to be changed in the encoder 30 and that the operand counter 146 is now receiving a pulse from the *d*22 output circuit of the pulse generator 143 and is stepping from state nineteen into state twenty. A pulse signal is developed on the execute line 140. During the following digit period four the execute line 78 receives a pulse signal. A signal is developed on the line 60 during digit period four and the change encoder address flip-flop T2 (see FIG. 3) is triggered into a "1" state. During digit periods five through ten of the pulse generator 143 the "and" gating circuit 186 causes the buffer register 80 to serially shift in and store the encoder address bits five through ten of the result word stored in the C register 128. During digit periods eleven through sixteen the "and" gating circuit 188 causes the translate buffer register 88 to serially shift in and store the new translated address bits eleven through sixteen of the result word stored in the C register 128. Thus, encoder address signals are now stored in the buffer register 80 and the new translated address signals are stored in the translate buffer register 88.

Since the change encoder address flip-flop T2 is in a "1" state during digit period seventeen a pulse signal is developed on the block control line 123. Simultaneously therewith, the "or" gating circuit 190 applies a control signal to the gating circuit 82 causing it to connect the output circuit of the buffer register 80 to the input circuit of the decoder circuit 22. The signal out of gate 190 is also applied to the decoder 22, causing it to address the encoder circuit 30. This blocks all the core units 100 in the addressed column or memory location (see FIG. 3) of the encoder 30.

During digit period eighteen gate 192 develops pulse signals on the write control line 125 and, simultaneously therewith, the gating circuits 82 and 200 receive control signals causing them to couple the output circuits of the buffer register 80 and the translate buffer register 88 to the write lines 119 and the ½-select address lines 32. This causes the translated address signals stored in the translate buffer register 88 to be stored in the encoder 30 memory location specified by the address stored in the buffer register 80. During digit period twenty-two, the change encoder address flip-flop T2 is reset into its "0" state again and the arithmetic control circuit 138 develops a pulse signal on the ready line 142 causing the result counter 148 to step from state twenty-five to state twenty-two where the operation of the computer system continues as described above. During the following digit period four the encoder 30 receives a reset signal from the reset signal generator 115 (FIG. 4–A).

What is claimed is:

1. A stored program computer system the combination which comprises memory means having a plurality of memory locations containing digital signal bits therein including instruction signals, the instruction signals including at least one address therein, instruction storage means, arithmetic means, read and write circuit means coupled to said memory means and operative for serially transferring the signals between a memory location corresponding to an applied address signal and said instruction register means and arithmetic means, encoder means separate from the memory means and having an output circuit at which translated address signals are applied substantially in parallel corresponding to applied address signals, means coupled to the instruction register means and encoder means for applying a signal to the encoder means corresponding to a stored instruction address and means coupled to the parallel output signals from said encoder means for selectively applying a corresponding address signal to said read and write circuit means.

2. A stored program computer system as defined in claim 1 wherein the encoder means comprises a magnetic core memory device having a plurality of memory locations containing translated addresses said system additionally comprising program control means for writing translated addresses in said magnetic core memory.

3. A stored program computer system the combination which comprises memory means having a plurality of memory locations containing digital signal bits therein including instruction signals, the instruction signals including at least one address and a bit designating whether the corresponding address is to be translated, instruction storage means, arithmetic means, read and write circuit means coupled to said memory means and operative for serially transferring the content of a memory location corresponding to an applied address signal to said instruction register means for storage and to said arithmetic means for computations, addressing means coupled between the instruction register means and the read and write circuit means for applying address signals, corresponding to a stored instruction address, to the read and write circuit means, and an encoder separate from the memory means and coupled to said addressing means for translating an instruction address to a different address, said addressing means being operative for applying address signals corresponding to said different address to said read and write circuit means in response to a bit in the corresponding instruction designating that the address is to be translated.

4. A stored program computer system the combination which comprises memory means having a plurality of memory locations containing digital signal bits therein including instruction signals, the instruction signals including at least one address and a bit designating whether the corresponding address is to be translated, instruction storage means, arithmetic means, read and write circuit means coupled to said memory means and operative for serially transferring the content of a memory location corresponding to an applied address signal to said instruction register means for storage and to said arithmetic means for computations, addressing means including gating means and decoding means coupled between the instruction register means and the read and write circuit means for applying an address signal, corresponding to a stored instruction address, to said read and write circuit means, and encoder separate from the memory means translating instruction addresses, said addressing means being coupled to the encoder and operative for applying an instruction address thereto causing the address to be translated to a different address, said addressing means being operative in response to the presence of a bit designating an address is to be translated for applying address signals corresponding to said different address to said read and write circuit means.

5. A stored program computer system the combination which comprises: memory means having a plurality of addressable locations containing digital signal bits including operand signals and instruction signals, the instruction signals including at least one address therein and at least one signal bit designating whether the address is to be translated; instruction register means; arithmetic means; said memory means including means coupled to said instruction register means and arithmetic means and operative for serially transferring the content of memory locations designated by applied address signals to said instruction register means for storage and to said arithmetic means for computations; translating means separate from said memory means having an output circuit and a plurality of addressable storage locations therein corresponding to the addresses in said instructions, the storage locations containing digital signal bits representative of translated addresses, said translating means being operative for causing a parallel transfer of translated address bits from a storage location which is designated by an applied address signal to said output circuit; and means coupled to said instruction register means and the output circuit of said translating means and operative for applying an address signal to said memory means corresponding to translated addresses derived from said translating means and untranslated instruction addresses stored in said instruction register means, the address signal means additionally comprising means coupled to the translating means and to said instruction register means for applying an address signal corresponding to a stored instruction address to said translating means causing a translated address to be transferred to the addressing signal means for use in addressing the memory means, said address signal means being operative for applying an address signal, corresponding to a translated address, to the memory means in response to a bit in the corresponding instruction designating that such address is to be translated.

6. A stored program computer system the combination of which comprises: memory means having a plurality of addressable locations containing digital signal bits including operand signals and instruction signals, the instruction signals including at least one address therein and at least one signal bit designating whether the corresponding address is to be translated; instruction register means; arithmetic means; said memory means being coupled to said instruction register means and arithmetic means and including means operative for serially transferring the content of memory locations designated by applied address signals to said instruction register means for storage and to said arithmetic means for computations; translating means separate from said memory means having an output circuit and a plurality of addressable storage locations therein corresponding to the addresses in said instructions, the storage locations containing digital signals bits representative of translated addresses, said translating means being operative for causing a parallel transfer of translated address bits from a storage location, which is designated by an applied address signal, to said output circuit; and addressing means coupled to said instruction register means and operative for applying an address signal, corresponding to an instruction address contained in a stored instruction, to said memory means, said addressing means additionally comprising means coupled to the output circuit of the translating means and operative in responsive to a bit contained in a stored instruction which designates an address is to be translated for applying an address signal, corresponding to a translated address from the output circuit of said translating means, to said memory means, said addressing means including means coupled to said translating means and to said instruction register means and operative for applying an address signal, corresponding to an instruction address contained in a stored instruction, to said translating means for causing a translated address signal to be transferred out thereof to the addressing means for use in addressing said memory means.

7. A stored program computer system the combination of which comprises: memory means having a plurality of addressable locations containing digital signal bits including operand signals and instruction signals, the instruction signals including at least one address therein and at least one signal bit designating whether the address is to be translated; instruction register means; arithmetic means; said memory means including means coupled to said instruction register means and arithmetic means and operative for serially transferring the content of memory locations designated by applied address signals to said instruction register means for storage and to said arithmetic means for computations; translating means separate from the memory means having an output circuit and a plurality of addressable storage locations therein corresponding to the addresses in said instructions, the storage location containing digital signal bits representative of translated addresses, said translating means being operative for causing a parallel transfer of translated address bits from a storage location, which is designated by an applied address signal, to said output circuit; and addressing means coupled to said instruction register means and operative for applying an address signal corresponding to a stored instruction address to said memory means, said addressing means additionally comprising a translated address register means coupled to the output circuit of said translating means and means coupled to the translated address register means and operative in responsive to a bit, in an instruction stored in the instruction register means, which designates that the corresponding address is to be translated, for applying an address signal to said memory means which corresponds to a translated address contained in the translated address register means, and means coupled to the instruction register means and to the translating means for applying an address signal to the translating means corresponding to an address contained in the instruction register means for causing a translated address to be stored in the translated address register means.

8. A stored program computer system the combination of which comprises: memory means having a plurality of addressable locations containing digital signal bits therein including operand signals and instruction signals, the instruction signals including at least one address therein and at least one signal bit designating whether the address is to be translated; register means for storing instructions; arithmetic means for performing operations on said operands; said memory means including means coupled to said instruction register means and arithmetic means and operative for serially transferring the content of memory locations designated by applied address signals to said instruction register means for storage and to said arithmetic means for computations; translating means separate from the memory means comprising an output circuit and a plurality of addressable storage locations therein corresponding to the addresses in said instructions, the storage locations containing digital signal bits representative of translated addresses, said translating means being operative for causing a parallel transfer of translated address bits from a storage location, which is designated by an applied address signal, to said output circuit; addressing means including address register means coupled to the translating means and instruction register means and adapted for storing addresses stored in said instruction register means and for storing translated addresses transferred to the output circuit of said translating means, decoding means coupled to said address register means and translating means and operative for applying a decoded address signal, corresponding to an instruction address contained in said address register means, to said translating means causing a translated address to be transferred out of the corresponding storage location and stored in the address register means, and means for sensing a bit in an instruction transferred from the memory means designating that the corresponding address is to be translated and for providing a unique output signal indicative thereof, said decoding means additionally being coupled to said memory means and operative for applying an address signal corresponding to an instruction address contained in the address register means to said memory means causing the content of the addressed memory location to be transferred out thereof, said addressing means including means being coupled to said sensing means and responsive to said unique signal for applying an address signal corresponding to a translated address contained in the address register to said decoding means.

9. A computer system as defined in claim 8 wherein said sensing means comprises a bistable device and gating means for sensing the presence of a translate bit, in an instruction stored in the instruction register means, which designates that the corresponding address is to be translated, said gating means being operative in response to the sensing of such bit for causing said bistable device to be set to a state indicating an address is to be translated, said address register means comprising first and second address registers, the first register being coupled to said instruction register means for storing addresses stored therein and said second register being coupled to said translating means for storing translated addresses transferred out thereof, said addressing means additionally comprising second gating means coupled between said first and second registers and said decoding means, said second gating means being operative for coupling the addresses contained in said first register to said decoding means and coupled to said bistable device and operative in response to a state indicating an address is to be translated for coupling the translated address contained in said second register to said decoding means.

10. A stored program computer system the combination which comprises serial memory means having a plurality of memory locations containing digital signal bits therein including instruction signals, the instruction signals including at least one address therein, instruction storage means, arithmetic means, the serial memory means being operative for serially transferring the content of a memory location corresponding to an applied address signal to said instruction register means for storage and to said arithemtic means for computations, magnetic core encoder means separate from said memory means having an output circuit at which modified address signals are applied substantially in parallel corresponding to applied address signals, means coupled to the instruction register means and encoder means for applying a signal to the encoder means corresponding to a stored instruction address and means coupled to the parallel output signals from said encoder means for selectively applying a corresponding address signal to said serial memory means.

11. A stored program computer system the combination which comprises magnetostrictive delay line memory means having a plurality of memory locations containing digital signal bits therein including instruction signals, the instruction signals including at least one address therein, instruction storage means, arithmetic means, said delay line memory means being operative for serially transferring the content of a memory location corresponding to an applied address signal to said instruction register means for storage and to said arithmetic means for computations, encoder means having an output circuit at which modified address signals are applied substantially in parallel corresponding to applied address signals, means coupled to the instruction register means and encoder means for applying a signal to the encoder means corresponding to a stored instruction address and means coupled to the parallel output signals from said encoder means for applying a corresponding address signal to said delay line memory means.

References Cited by the Examiner

UNITED STATES PATENTS

| | | | |
|---|---|---|---|
| 2,989,732 | 6/1961 | Young ----------- | 340—172.5 |
| 3,014,660 | 12/1961 | Patterson et al. ---- | 340—172.5 |
| 3,037,700 | 6/1962 | Clapper ----------- | 340—172.5 |

OTHER REFERENCES

Jones: Indirect Addressing Arrangement, IBM Technical Disclosure Bulletin, pages 49–51, August 1961.

ROBERT C. BAILEY, *Primary Examiner.*

MALCOLM A. MORRISON, *Examiner.*

W. M. BECKER, P. J. HENON, *Assistant Examiners.*